United States Patent
Chuang

(10) Patent No.: US 8,717,313 B2
(45) Date of Patent: May 6, 2014

(54) TOUCH PANEL

(75) Inventor: Kai-Cheng Chuang, Tainan (TW)

(73) Assignee: E Ink Holdings Inc., Hsinchu (TW)

( * ) Notice: Subject to any disclaimer, the term of this patent is extended or adjusted under 35 U.S.C. 154(b) by 346 days.

(21) Appl. No.: 12/848,996

(22) Filed: Aug. 2, 2010

(65) Prior Publication Data

US 2012/0026125 A1     Feb. 2, 2012

(51) Int. Cl.
*G06F 3/041* (2006.01)

(52) U.S. Cl.
USPC .......................................... 345/173; 345/179

(58) Field of Classification Search
USPC ................................................ 345/156–184
See application file for complete search history.

(56) References Cited

U.S. PATENT DOCUMENTS

| | | | |
|---|---|---|---|
| 5,510,813 A * | 4/1996 | Makinwa et al. | 345/173 |
| 5,680,160 A * | 10/1997 | LaPointe | 345/173 |
| 6,667,740 B2 * | 12/2003 | Ely et al. | 345/179 |
| 7,145,555 B2 * | 12/2006 | Taylor et al. | 345/173 |
| 7,696,987 B2 * | 4/2010 | Popovich | 345/179 |
| 8,243,049 B2 * | 8/2012 | Vos | 345/179 |
| 2004/0233178 A1 * | 11/2004 | Silk et al. | 345/179 |
| 2004/0239652 A1 * | 12/2004 | Taylor et al. | 345/179 |
| 2005/0280634 A1 * | 12/2005 | Tanabe et al. | 345/173 |
| 2008/0266333 A1 * | 10/2008 | Silverstein et al. | 345/691 |

* cited by examiner

*Primary Examiner* — Kent Chang
*Assistant Examiner* — William Lu
(74) *Attorney, Agent, or Firm* — Guice Patents PLLC

(57) ABSTRACT

A touch panel, operated by a magnetic stylus, including: a display panel, having a display plane and an interface plane, the interface plane underlying the display plane; and a sensing assembly, underlying the display panel, having a first conductive layer, a second conductive layer, and a plurality of insulating spacers, the first conductive layer underlying the interface plane, and the insulating spacers being placed between the first conductive layer and the second conductive layer to divide the first conductive layer and the second conductive layer into a plurality of first conductive segments and a plurality of second conductive segments respectively, wherein one of the second conductive segments will be bent upward by a magnetic force to electrically connect with one of the first conductive segments when the magnetic stylus is applied thereto.

8 Claims, 1 Drawing Sheet

TOUCH PANEL

BACKGROUND OF THE INVENTION

1. Field of the Invention

The present invention relates to a touch panel, especially to a touch panel of which the touch input function is realized by the effect of a magnetic force.

2. Description of the Related Art

As is known, a touch module, if placed over a display panel, has to be implemented with transparent materials like glass and ITO (Indium Tin Oxside), so as not to hinder the display of the display panel. However, if the display panel is a reflective one—utilizing surrounding lighting for illumination, then the illumination attenuation caused by the touch module can still degrade the display brightness, even though the touch module is made of transparent materials. As such, the reflective display panel is placed in general over the touch module.

Besides, to avoid damaging the display panel which overlies the touch module, when performing a touch input, non-contact mechanism like capacitive or optical sensing is commonly utilized for the touch module. However, in implementing the touch module, either utilizing transparent materials like glass or ITO, or employing a non-contact mechanism like capacitive or optical sensing, can increase the cost and the control circuit complexity.

To prevent the disadvantages of the reflective display having touch input function mentioned above, the present invention proposes a novel display architecture, which utilizes a magnetic force effect to implement the touch input function, and by which not only can the illumination attenuation problem be avoided, but also cheaper plastics and general metal can be employed to reduce the manufacturing cost.

SUMMARY OF THE INVENTION

One objective of the present invention is to disclose a touch panel, of which the touch input function is realized by a magnetic force effect.

Another objective of the present invention is to disclose a touch panel, of which the touch sensing module can be made of cheaper plastics and general metal to reduce manufacturing cost.

To attain the foregoing objectives, the present invention proposes a touch panel operated by a magnetic stylus, the touch panel including: a display panel, having a display plane and an interface plane, the interface plane underlying the display plane; and a sensing assembly, underlying the display panel, having a first conductive layer, a second conductive layer, and a plurality of insulating spacers, the first conductive layer underlying the interface plane, and the insulating spacers being placed between the first conductive layer and the second conductive layer to divide the first conductive layer and the second conductive layer into a plurality of first conductive segments and a plurality of second conductive segments respectively, wherein one of the second conductive segments will be bent upward by a magnetic force to electrically connect with one of the first conductive segments when the magnetic stylus is applied thereto.

To make it easier for our examiner to understand the objective of the invention, its structure, innovative features, and performance, we use a preferred embodiment together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiment of the invention.

Figure 1:
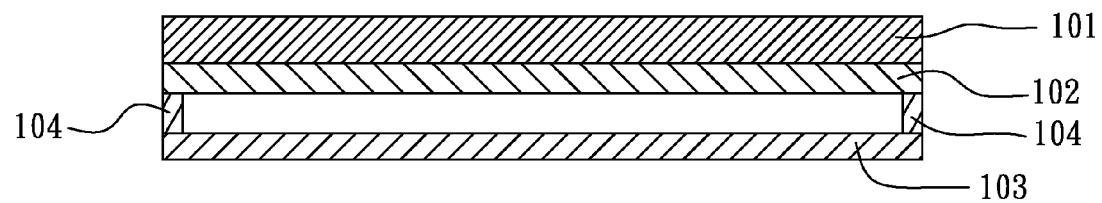
FIG. 1 illustrates a structural cross-section of a touch panel according to a preferred embodiment of the present invention.

Please refer to FIG. 1, which illustrates a structural cross-section of a touch panel according to a preferred embodiment of the present invention. As illustrated in FIG. 1, the touch panel includes an electronic paper panel 101, a first conductive layer 102, a second conductive layer 103, and a plurality of insulating spacers 104.

The electronic paper panel 101, having a display plane and an interface plane—the interface plane underlying the display plane, is used to display an image on the display plane, wherein the data for the image is received from an electronic paper input port (not illustrated in the figure). The electronic paper panel 101 can be implemented with an electrophoresis display, a MEMS (Micro Electro Mechanical Systems) display, a cholesteric liquid crystal display, an electrowetting display, or a liquid crystal display, and the electronic paper input port is preferably a USB connection port.

The first conductive layer 102, the second conductive layer 103, and the insulating spacers 104 are used to form a sensing assembly, which is preferably a resistive touch sensing module, wherein the first conductive layer 102 underlies the interface plane of the electronic paper panel 102, and the first conductive layer 102 is preferably made of general metal like copper, or aluminum.

The second conductive layer 103, spaced from the first conductive layer 102 by the insulating spacers 104, can be made of general metal like copper, or aluminum.

The insulating spacers 104 are used to space the second conductive layer 103 from the first conductive layer 102 by a gap, and divide the first conductive layer 102 and the second conductive layer 103 into a plurality of first conductive segments and a plurality of second conductive segments respectively. The insulating spacers 104 are preferably made of plastics.

Figure 2:
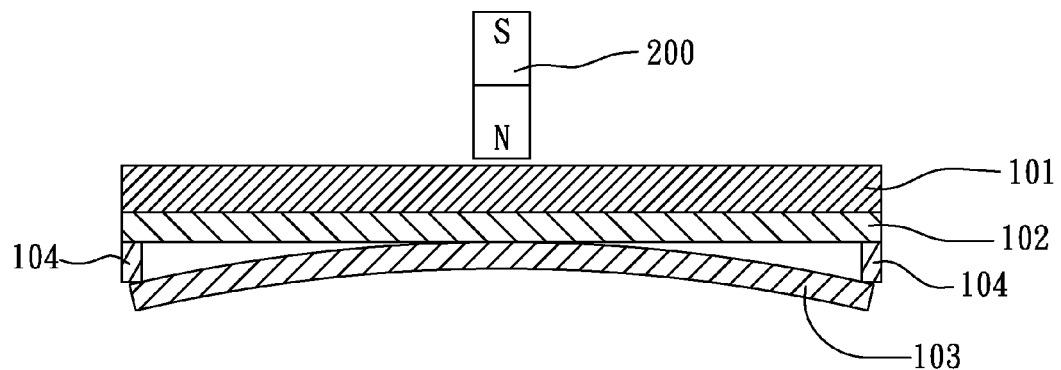
FIG. 2 illustrates the principle of the touch input function of a touch panel according to a preferred embodiment of the present invention.

Please refer to FIG. 2, which illustrates the touch principle of the present invention. As illustrated in FIG. 2, with a magnetic stylus 200 applied near the electronic paper panel 101, a magnetic force generated thereof bends one of the second conductive segments to be in electrical connection with one of the first conductive segments. A controller (not illustrated in the figure) then generates a signal indicating the touch position in response to the electrical connection.

When the magnetic stylus 200 is moved away from the electronic paper panel 101, the second conductive segment which was bent by the magnetic force will be restored by gravity and an elastic force.

Thanks to the novel design, the present invention has the following advantages:

1. As the touch panel is placed under the display panel, the display brightness of the display panel of the present invention is not influenced.

2. As the touch input function of the present invention is realized using a magnetic force effect which does not involve deforming the display panel, the present invention can therefore prevent the display panel from being damaged when a touch input is performed.

3. As the touch module of the present invention can be implemented with plastics and general metal, eliminating the need of more expensive transparent materials like glass or ITO, the present invention can therefore reduce the manufacturing cost.

In conclusion, the touch panel of the present invention can provide not only better display brightness, but also a touch input function without damaging the display panel, so the present invention does improve the prior art reflective touch panel.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. A touch panel, operated by a magnetic stylus, comprising:
    a display panel having a display plane and an interface plane, said interface plane is located under said display plane; and
    a sensing assembly located under said display panel and having a first conductive layer, a second conductive layer, and a plurality of insulating spacers, said first conductive layer and said second conductive layer are each made of a metal selected from a group consisting of copper and aluminum, said first conductive layer directly engaging said interface plane of said display panel, and said plurality of insulating spacers being located between said first conductive layer and said second conductive layer and dividing said first conductive layer and said second conductive layer into a plurality of first conductive segments and a plurality of second conductive segments respectively, wherein, when said magnetic stylus is applied to said display panel, a single metal layer being a corresponding second conductive segment of said plurality of second conductive segments is bent upwardly by a magnetic force of said magnetic stylus and is electrically connected with a corresponding first conductive segment of said plurality of first conductive segments.

2. The touch panel according to claim 1, further comprising a controller, which is coupled with said display panel and said sensing assembly.

3. The touch panel according to claim 1, wherein said sensing assembly is a resistive touch sensing module.

4. The touch panel according to claim 1, wherein said display panel is an electronic paper display.

5. The touch panel according to claim 1, wherein said insulating spacers are made of plastics.

6. The touch panel according to claim 1, wherein, when said magnetic stylus is moved away from said corresponding second conductive segment, said corresponding second conductive segment is restored by gravity and an elastic force.

7. The touch panel according to claim 1, wherein, when said magnetic stylus is applied to said display panel, said corresponding second conductive segment of said plurality of second conductive segments is bent upwardly.

8. A touch panel, operated by a magnetic stylus, comprising:
    a display panel having a display plane and an interface plane, said interface plane located under said display plane; and
    a sensing assembly located under said display panel and having a first conductive layer, a second conductive layer, and a plurality of insulating spacers, said first conductive layer and said second conductive layer are each made of a metal selected from a group consisting of copper and aluminum, said first conductive layer directly engaging said interface plane of said display panel, and said plurality of insulating spacers being located between said first conductive layer and said second conductive layer and separating said first conductive layer and said second conductive layer, wherein a single metal layer being said second conductive layer is bent upwardly by a magnetic force of said stylus and is electrically connected with said first conductive layer when said magnetic stylus is applied to said touch panel.

* * * * *